(12) United States Patent
White et al.

(10) Patent No.: US 6,772,104 B1
(45) Date of Patent: Aug. 3, 2004

(54) METHOD FOR DETERMINING TRANSPORTATION VEHICLE CUSTOMER SATISFACTION

(75) Inventors: James Bruce White, Windsor (CA); Michael Choi, Garden City, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/543,629

(22) Filed: Apr. 5, 2000

(51) Int. Cl.$^7$ ................................................ G06G 7/48
(52) U.S. Cl. ............................. 703/8; 700/151; 705/7; 705/10
(58) Field of Search ........................... 703/8; 700/151; 73/117.3; 701/29; 705/10, 7

(56) References Cited

U.S. PATENT DOCUMENTS 5,691,909 A * 11/1997 Frey et al. .................. 700/159
6,188,938 B1 * 2/2001 Silka et al. .................... 701/29
6,481,271 B1 * 11/2002 Ward et al. ................ 73/117.3

OTHER PUBLICATIONS

"Juran on Quality by Design", by J. M. Juran, The Free Press, 1992, ISBN 0–02–916683–7, p. 462–467 on Taurus.*
"Handbook of Industrial Engineering", by Gavriel Salvendy, Second Edition, John Wiley & Sons, Inc., 1992, ISBN 0–471–50276–6, pp. 1047–1054 on noise.*
"Design and Optimization Of Thermal Systems", The McGraw–Hill Companies, Inc., Yogesh Jaluria, 1998, pp.: 448–484.
"Vector Calculus", Third Edition, W.H. Freeman and Company, Jerrold E. Marsden & Anthony J. Tromba, 1988, pp.: 248–256.
"Robust Regression and Outlier Detection", John Wiley & Sons, Peter J. Rousseeue & Annick M. Leroy, 1987, pp.: 1–3, 14–15, 132–135.
"Probability and Statistics for Engineering and the Sciences", Brooks/Cole Publishing Company, Jay L. Devore, 1982, pp.: 157–159.
"Acoustics–Method for Calculating Loudness Level", International Standard ISO 532, 1975, pp.: 2–18.

* cited by examiner

Primary Examiner—Kevin J. Teska
Assistant Examiner—Edurado Garcia-Otero
(74) Attorney, Agent, or Firm—David B. Kelley

(57) ABSTRACT

Within a method for predicting customer satisfaction for a transportation vehicle there is measured for the transportation vehicle a Noise, Vibration and Harshness (NVH) level within the transportation vehicle when an engine which powers the transportation vehicle is operating at wide open throttle. The method further provides for determining a customer satisfaction value for a specific transportation vehicle by means of interpolation or extrapolation from an existing correlation for a group of transportation vehicles within the same class. Such a correlation is obtained employing a Transformed Gamma Distribution (TGD) model or an aggregate combination of Transformed Gamma Distribution (TGD) models.

12 Claims, 2 Drawing Sheets

METHOD FOR DETERMINING TRANSPORTATION VEHICLE CUSTOMER SATISFACTION

BACKGROUND OF THE INVENTION

1. Field of the Invention

The present invention relates generally to transportation vehicles. More particularly, the present invention relates to methods for determining transportation vehicle customer satisfaction.

2. Description of the Related Art

In the process of transportation vehicle design, development and manufacturing, transportation vehicle manufacturers often pay particular attention to manufacturing and developing transportation vehicle designs, which provide transportation vehicles, which in turn provide high levels of customer satisfaction. High levels of customer satisfaction are desirable within the context of transportation vehicle design, development and manufacturing since high levels of customer satisfaction generally provide with respect to an individual transportation vehicle manufacturer and an individual customer brand loyalty which provides for purchase of multiple additional transportation vehicles from the individual transportation vehicle manufacturer by the individual customer.

While high levels of customer satisfaction are thus clearly desirable within the art of transportation vehicle design, development and manufacturing, providing transportation vehicle designs which may be developed and manufactured to provide transportation vehicles which provide high levels of customer satisfaction is nonetheless not entirely without problems within the art of transportation vehicle design, development and manufacturing.

In that regard, it is often difficult to provide transportation vehicle designs which may be developed and manufactured to provide high levels of customer satisfaction, in part, since while transportation vehicle design, development and manufacturing is typically directed towards physical components and subassemblies which are employed when designing, developing and manufacturing a transportation vehicle, transportation vehicle customer satisfaction is in contrast generally recognized as a subjective characteristic which is often difficult to directly correlate with respect to specific transportation vehicle physical components and subassemblies which are employed when designing, developing and manufacturing a transportation vehicle.

There thus exists within the art of transportation vehicle design, development and manufacturing a continuing need for methods for determining transportation vehicle customer satisfaction, preferably at early stages in design, development and manufacturing of transportation vehicles.

It is towards the foregoing object that the present invention is directed.

SUMMARY OF THE INVENTION

In accord with the object towards which the present invention is directed, there is provided by the present invention a method for predicting customer satisfaction for a transportation vehicle. In its most general sense, the method realizes the foregoing object by measuring for the transportation vehicle a Noise, Vibration and Harshness (NVH) level within the transportation vehicle when an engine which powers the transportation vehicle is operating at wide open throttle. Within the present invention and the preferred embodiment of the present invention, the Noise, Vibration and Harshness (NVH) level is typically and preferably an interior loudness level.

In a more specific sense, the present invention also provides a method for determining for a specific transportation vehicle an as yet undetermined expected customer satisfaction level, which might otherwise be determined, for example, by survey, where the as yet undetermined expected customer satisfaction level is determined by extrapolation or interpolation from a series of measurements of Noise, Vibration and Harshness (NVH) levels for a group of transportation vehicles, typically and preferably of a class analogous or equivalent to the class of transportation vehicle in which the specific transportation vehicle is a member.

BRIEF DESCRIPTION OF THE DRAWING

The object, features and advantages of the present invention are understood within the context of the Description of the Preferred Embodiment, as set forth below. The Description of the Preferred Embodiment is understood within the context of the accompanying drawings, which form a material part of this disclosure, wherein:

FIG. 1 shows a schematic process flow diagram illustrating a series of process steps in accord with the present invention.

FIG. 2 shows a graph of the Percent Measured High Customer Satisfaction Level versus Phons Weighted Average derived from Phons versus Engine Revolutions Per Minute in accord with an example of the present invention.

FIG. 3 shows a graph of the Predicted Percent High Customer Satisfaction Level versus Customer Survey Measured Percent High Customer Satisfaction Level in accord with an example of the present invention.

DESCRIPTION OF THE PREFERRED EMBODIMENT

Referring now to FIG. 1, there is shown a schematic process flow diagram illustrating a series of process steps in accord with the method of the present invention. In particular, there is illustrated within FIG. 1, in conjunction with reference numeral 10, the first process step in accord with the method of the present invention. In accord with the process step which corresponds with reference numeral 10, there is first provided within the present invention a group of transportation vehicles.

Within the context of the preferred embodiment of the present invention, the group of transportation vehicles which is provided is typically and preferably selected from a single class of transportation vehicles, where the single class of transportation vehicles is selected from the group including but not limited to sports passenger transportation vehicles, sub-compact passenger transportation vehicles, compact passenger transportation vehicles, standard passenger transportation vehicles, luxury passenger transportation vehicles, sport utility transportation vehicles, light utility transportation vehicles and heavy utility transportation vehicles.

Typically and preferably, within the preferred embodiment of the present invention there is provided within the group of transportation vehicles a number of transportation vehicles ranging from about 10 to about 30. Similarly, typically and preferably, the group of transportation vehicles which is provided from the single class of transportation vehicles will encompass a multiplicity of transportation vehicle manufacturers which manufactures transportation vehicles within the single class of transportation vehicles.

Figure 1:
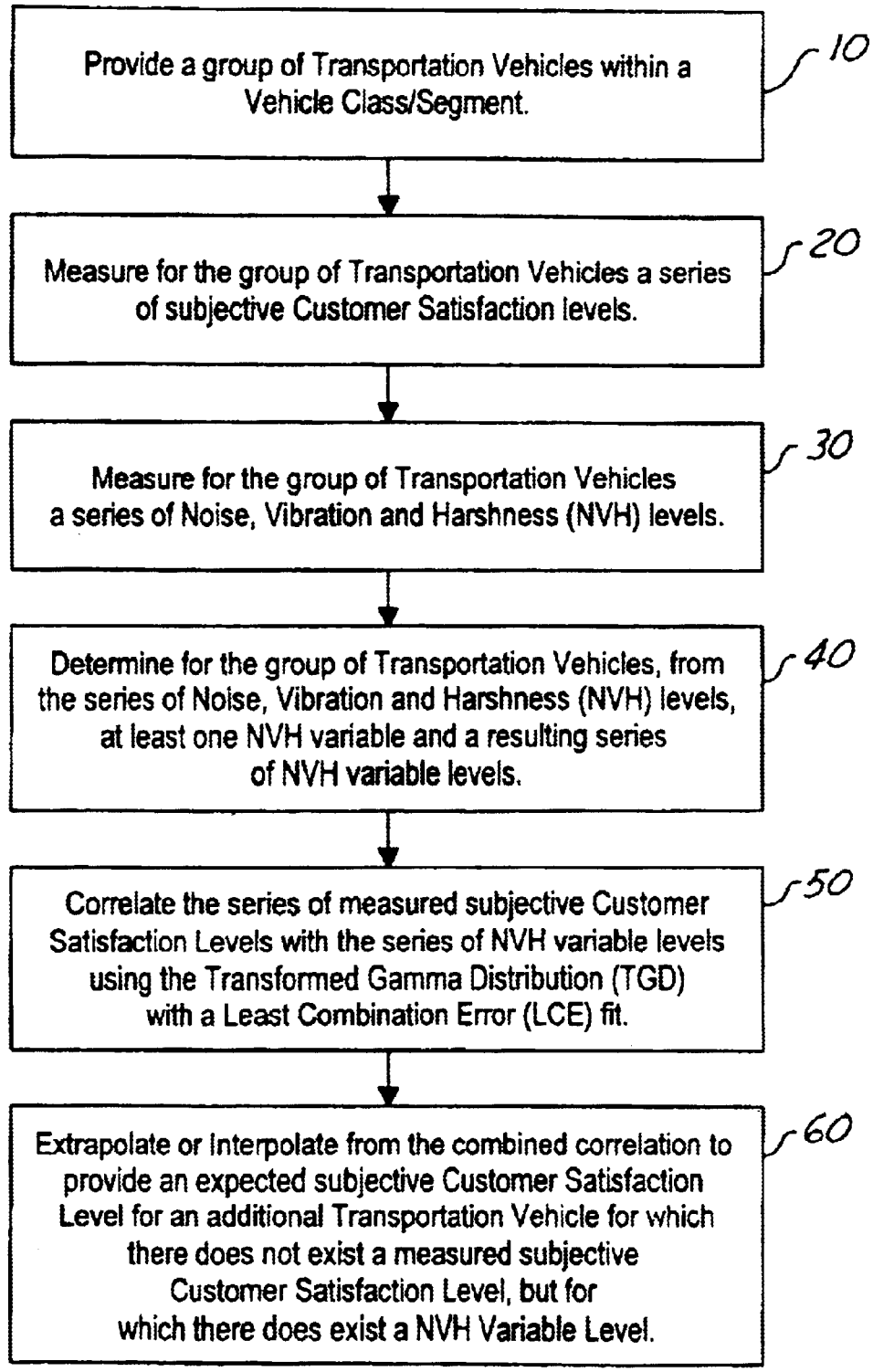

Yet similarly, typically and preferably, each transportation vehicle within the group of transportation vehicles from the single class of transportation vehicles will typically and preferably have an odometer mileage of from about 3000 to about 7000 miles, as accrued over a usage of from about 2.5 to about 3.5 months, which usage is representative of normal usage absent extraordinary wear.

Referring again to FIG. 1, there is illustrated in conjunction with reference numeral 20 the next process step in accord with the method of the present invention. In accord with the process step which corresponds with reference numeral 20, there is measured for each transportation vehicle within the group of transportation vehicles a subjective customer satisfaction level of a customer who operates the transportation vehicle, to thus provide a series of subjective customer satisfaction levels for the group of transportation vehicles.

Within the preferred embodiment of the present invention with respect to the measurement of subjective customer satisfaction levels, the measurement of subjective customer satisfaction levels may be directed towards a general subjective customer satisfaction level, or as an adjunct or in the alternative directed more specifically towards specific attributes of transportation vehicle customer satisfaction, such as but not limited to transportation vehicle Noise, Vibration and Harshness (NVH) customer satisfaction, which further may be defined in terms of transportation vehicle noise and transportation vehicle vibration. Within the preferred embodiment of the present invention with respect to the measurement of the series of subjective customer satisfaction levels of the group of transportation vehicles, such subjective customer satisfaction levels may typically and preferably be determined while employing survey methods wherein owners of a target class of transportation vehicles registered for a requisite time period are surveyed regarding their subjective customer satisfaction level with respect to a transportation vehicle which they have purchased within the target class. Typically and preferably, such subjective customer satisfaction level survey data is obtained within a format of a ranking on a scale of 1–10, where 1 represents a minimum amount of customer satisfaction and 10 represents a maximum amount of customer satisfaction. For the purposes of the present invention, a customer satisfaction level rating of either 9 or 10 is understood as a "high" customer satisfaction level rating.

Referring again to FIG. 1, there is illustrated in conjunction with reference numeral 30 the next process step in accord with the method of the present invention. In accord with the process step, which corresponds with reference numeral 30, there is measured for each transportation vehicle within the group of transportation vehicles a NVH level to provide a series of NVH levels. Although the NVH for which the NVH level is measured may be selected from the group of NVH parameters including but not limited to vibration (such as but not limited to steering wheel vibration, seat track vibration, stick shift vibration and frame/chassis vibration) and loudness (such as but not limited to interior loudness, engine loudness, powertrain loudness, intake system loudness and exhaust system loudness), where a loudness, such as a noise field loudness, may be correlated with a sound quality, for the preferred embodiment of the present invention, it has been determined experimentally to be particularly preferable to employ as a NVH parameter a vehicular interior loudness measured at a driver's outboard ear within a vehicle interior under conditions of a wide open throttle (i.e., from about 1000 to the maximum revolutions per minute (rpm)) for an engine which powers the transportation vehicle.

Typically and preferably, the interior loudness measurement will be obtained employing methods as are in general conventional in the art of loudness measurement. For example and without limitation, such interior loudness measurements may be obtained by applying a Zwicker ⅓ octave diffuse field method to the recorded noise frequency spectrum levels to produce the Sones loudness levels, as is disclosed, for example and also without limitation, within ISO Standard 532-1975(E). For the preferred embodiment of the present invention, the interior loudness is typically and preferably measured in Sones.

Referring again to FIG. 1, there is illustrated in conjunction with reference numeral 40 the next process step in accord with the method of the present invention. In accord with the process step which corresponds with reference numeral 40, there is determined from the series of NVH levels at least one NVH variable and a resulting series of NVH variable levels.

For the preferred embodiment of the present invention where the NVH level measurement is an interior loudness measurement at a driver's outboard ear as a function of engine revolutions per minute (rpm), and where the interior loudness is measured in Sones, there is in turn calculated in a first instance from the measured interior loudnesses as a function of engine revolutions per minuted (rpm) in Sones a series of interior loudnesses in Phons as a function of engine revolutions per minute (rpm), while employing equation 1, as follows.

$$P = 40 + 10 \log_2(S_i) \tag{1}$$

Within equation 1, $S_i$ represents an individual measured interior loudness data point in Sones and P represents an individual calculated loudness data point in Phons calculated from the individual measured interior loudness data point in Sones. Similarly, within the preferred embodiment of the present invention, there is also then calculated from the measured interior loudness data points in Sones as a function of engine revolutions per minute (rpm) a slope of the least squares best fit linear regression line through the measured interior loudness data points in Sones as a function of engine revolutions per minute (rpm) curve. This variable is defined as sm. Yet similarly, there is then also further calculated from the calculated interior loudness data points in Phons as a function of engine revolutions per minute (rpm) a peak Phons value over the entire Phons versus engine revolutions per minute (rpm) curve. This variable is defined as pmax. Finally yet similarly, there is then also further calculated from the calculated interior loudness data points in Phons as a function of engine revolutions per minute (rpm) a Phons weighted average defined as the area under the Phons versus engine revolutions per minute (rpm) curve over the entire range of the Phons versus engine revolutions per minute (rpm) curve. This final variable is defined as pwavg.

Referring again to FIG. 1, there is illustrated in conjunction with reference numeral 50 the next process step in accord with the method of the present invention. In accord with the process step which corresponds with reference numeral 50, there is then correlated the series of measured subjective customer satisfaction levels with the series of NVH variable levels to provide a correlation. Alternatively, within the present invention there may under certain circumstances be correlated the series of NVH levels rather than the series of NVH variable levels, to provide the correlation, where the NVH levels and the NVH variable levels are, within the context of the present invention, further defined as NVH parameters. Within the context of the preferred embodiment of the present invention, the correlation of the measured customer satisfaction levels with the series of NVH variable levels is typically and preferably undertaken by providing a plot of the series of measured customer satisfaction levels as a function of each of the three foregoing calculated NVH variable levels (i.e., sm, pmax and pwavg).

Figure 2:
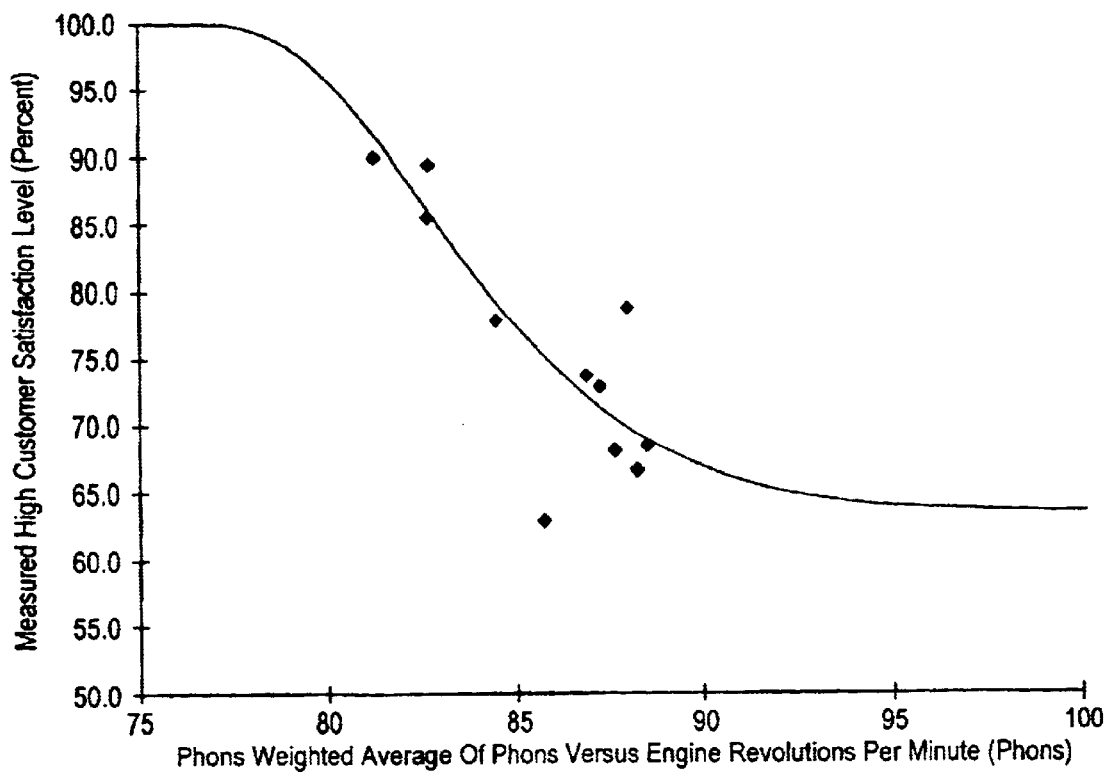

An example of such a plot is provided in FIG. 2 wherein there is illustrated a plot of Measured High Customer Satisfaction (in percent) (i.e., percentage of customers reporting a 9 or a 10 on a 1–10 scale) versus Phons Weighted Average of Phons versus Revolutions Per Minute (in Phons), for a series of eleven four wheel drive sport utility vehicles which is not otherwise specifically identified, but which represents a selection of four wheel drive sport utility vehicles which may be obtained from a plurality of transportation vehicle manufacturers. Within the context specifically of FIG. 2, each of the four wheel drive sport utility vehicles points is defined by a sample of single identified vehicle owners, where each owned their vehicle for a time period of from about 2.5 to about 3.5 months during which time period the individual four wheel drive sport utility vehicles had accrued an odometer mileage of from about 3000 to about 7000 miles.

As is also shown within the plot of FIG. 2, there is determined a curve which correlates the data points directed towards Measured High Customer Satisfaction Level versus Phons Weighted Average of Phons versus Engine Revolutions Per Minute. With respect to the curve which correlates the data points, it has been determined experientially within the context of the present invention that an optimal correlation of the data points is obtained within a plot of customer satisfaction versus a NVH variable or a NVH parameter, such as the graph as is illustrated within the FIG. 2, while employing a Transformed Gamma Distribution (TGD) model with respect to each measured or calculated variable which is correlated with subjective customer satisfaction level. The Transformed Gamma Distribution (TGD) is defined in equation 2, as follows.

$$TGD(x, \alpha, \beta) = \begin{cases} [1 - CGD(x - Xshift, \alpha, \beta)] * (100\% - CSmin) + CSmin; & x > Xshift \\ 100\%; & \text{otherwise} \end{cases} \quad (2)$$

where $$CGD(x, \alpha, \beta) = \int_0^x \left( \frac{1}{\beta^\alpha \Gamma(\alpha)} x^{\alpha-1} e^{-\frac{x}{\beta}} \right) \quad (3)$$

Within equation 2, x represents a particular NVH variable or NVH parameter. CSmin represents the minimum Customer Satisfaction level defined by the lower vertical asymptote as seen in FIG. 2. Xshift represents the value of a particular NVH variable or NVH parameter when the Measured High Customer Satisfaction Level reaches 100%. $\alpha$ and $\beta$ represent statistical coefficients that affect the shape of the curve shown in FIG. 2. $\alpha$ and $\beta$ are coefficients from the Cumulative Gamma Distribution (CGD), which is shown in equation 3. The Cumulative Gamma Distribution (CGD) is a standard statistical curve and is defined within "Probability and Statistics for Engineering and the Sciences" (Jay L. Devore, Brooks/Cole Publishing Company, 1991, pp. 157–159)

Similarly, the Transformed Gamma Distribution (TGD) model employs a unique intelligent range reduction scheme while employing a fit defined as the Least Combination Error (LCE) fit which provides optimal curve fitting (i.e., determination of curve fitting coefficients), rather than a Least Square Error (LSE) fit, which is generally more common in the art of statistical analysis. The Least Combination Error (LCE) fit is a combination of the standard Least Square Error (LSE) fit and the Least Trimmed Squares Error (LTSE) fit. In discussing curve fits it is necessary to define the Residual ($r_i$) in equation 4, as follows:

$$r_i = y_i - \hat{y}_i \quad (4)$$

Within equation 4, $y_i$ represents the actual or measured value and $y_i$ represents the predicted or estimated value of $y_i$ from the correlation. LSE and LTSE fit are clearly defined within "Robust Regression and Outlier Detection" (Peter J. Rousseeuw and Annick M. Leroy, John Wiley & Sons Inc., 1987, pp. 1–3, 14–15, 132–135) and as follows.

$$\text{Minimize } LSE(n) \equiv \sum_{i=1}^{n} r_i^2 \quad (5)$$

$$\text{Minimize } LTSE(n, h) \equiv \sum_{i=1}^{h} (r^2)_{n:n}, \quad (6)$$

where $(r^2)_{1:n} \leq (r^2)_{2:n} \leq \hat{E} \leq (r^2)_{n:n}$ where $$h(\text{trim}, p, n) = Int([n(1 - \text{trim})] + [\text{trim}(p + 1)]) \quad (7)$$

Within equation 5, n represents the sample size or the total number of vehicles used for correlation. Within equation 6, each $(r^2)_{i:n}$ represents a squared residual, ordered from smallest to largest, h represents an integer between 1 and n, defined by equation 7. Within equation 7, trim represents the trimming percentage to be used, where trim is from 0% to 50%, p represents the number of curve coefficients required for the curve, which always equals 4 for the TGD. Using these definitions, the Least Combination Error (LCE) fit Minimizes LCE where LCE is defined as follows.

$$LCE = [(LSEwgt*(LSE(n)/n) + LTSE1wgt*(LTSE(n,h_1)/h_1) + LTSE2wgt*(LTSE(n,h_2)/h_2))/LCEtotwgt]*n \quad (8)$$

where $$h_1 = h(\text{trim}/2, p, n); h_2 = h(\text{trim}, p, n) \quad (9), (10)$$

$$LCEtotwgt = LSEwgt + LTSE1wgt + LTSE2wgt \quad (11)$$

Within equation 8, LSEwgt, LTSE1wgt and LTSE2wgt are the weighting factors applied to the three combined fits included within the LCE fit.

The intelligent range reduction scheme used when employing the above mentioned Least Combination Error (LCE) fit is both unique and necessary. The four curve coefficients of the Transformed Gamma Distribution (TGD) model have the following properties and range restrictions. The range of possible CSmin values is between 0% and 100% of High Customer Satisfaction. The range of possible Xshift values is between zero and positive infinity. The range of $\alpha$ and $\beta$ is typically and preferably restricted to 0.1 to 50.1 for both. Finding the coefficient values to acheive the minimum value of LCE is by definition a Multivariable Constrained Optimization. Because of the nonlinearities of the TGD model, it can be shown that across the possible coefficient ranges the optimal solution (ie. at the global minimum of LCE) lies in a Saddle Region at a Saddle Point, described within "Vector Calculus" ($3^{rd}$ Edition, Jerrold E.

Marsden and Anthony J. Tromba, W. H. Freeman and Company, 1988, pp. 248–256). It can also be shown that across the possible coefficient ranges the TGD model is not unimodal or has more than one local minimum. As such, the typical search methods and gradient assisted search as described within "Design and Optimization of Thermal Systems" (Yogesh Jaluria, McGraw-Hill, 1998, pp. 448–484) do not work or so computational demanding that a single correlation could take days to months to complete.

The intelligent range reduction scheme employed solves these problems in the following manner. The ranges of the data points, made up of the individual vehicles, are scanned. Based on these input ranges the initial ranges or initial ranges of uncertainty are set as follows. CSmin has its initial range set to an interval around the minimum Customer Satisfaction value in the data points, with this minimum as the center. Xshift has its initial range set to an interval around minimum value of NVH variable or NVH parameter in the data points, with this minimum as the center. The initial ranges both $\alpha$ and $\beta$ are typically and preferably set to 0.1 to 50.1 for both. Then a course grid is setup across CSmin, Xshift and one of $\alpha$ and $\beta$. In the first iteration of the search, all the points defined by the grids or subdivisions of CSmin, Xshift and one of $\alpha$ and $\beta$ (ie. CSmin, Xshift and $\beta$) define subranges or subdomains of uncertainty. Each such subrange is then searched along the other of $\alpha$ and $\beta$, which was not subdivided into a grid (ie. $\alpha$) by using a Fibonacci Search, which as defined in the last reference, and using a specified tolerance for the value of the other of $\alpha$ and $\beta$ (ie. $\alpha$). At the completion of the first iteration the subranges or subdomains that may contain the optimum solution or global minimum of LCE are identified. In the next iteration each identified subrange or subdomain is searched in a similar manner to the first iteration, with regions around each subrange or subdomain that is larger than the identified subrange or subdomain. In each successive iteration the ranges of the coefficients that is seached within each subdoman is reduced, except for the coefficient of $\alpha$ and $\beta$ that is searched using a Fibonacci Search, whose searching range or interval of uncertainty is fixed at 0.1 to 50.1 for all iterations and subdomains. This pattern of iterations is continued until the defined tolerances on each coefficient are reached and the optimum solution with the global minimum LCE is identified. Essentially the intelligent range reduction scheme surveys the entire initial region of uncertainty and then zooms in telescopically on each identified subregion until the optimum solution is found. This intelligent range reduction scheme reduces computing time by over 20 times versus an equivalent Exhaustive search method, which is defined in the last reference.

Referring again to FIG. 1, there is illustrated in conjunction with reference numeral 60 a final step in accord with the method of the present invention. In accord with the process step which corresponds with reference numeral 60, there is then extrapolated or interpolated from the correlation of measured subjective customer satisfaction levels with the series of NVH variable levels for an additional transportation vehicle to provide an expected subjective customer satisfaction level for the additional transportation vehicle for which there does not exist a measured subjective customer satisfaction level but for which there does exist a NVH variable level, either measured or derived from a computer model or simulation.

Within the context of the preferred embodiment of the present invention, the transportation vehicle for which there does not exist a measured subjective customer satisfaction level will typically and preferably be a new transportation vehicle or a prototype transportation vehicle. Under such circumstances, and in particular for a prototype transportation vehicle, an expected subjective customer satisfaction level early in its design, development and manufacturing is desirable such that design, development and manufacturing revisions may be made to provide the transportation vehicle with optimized customer satisfaction level.

While the invention as disclosed within the schematic process flow diagram of FIG. 1 may in itself be employed for determining by means of extrapolation or interpolation an expected subjective customer satisfaction level for a transportation vehicle based upon correlation with a NVH variable level derived from a NVH level, the present invention also provides that there may be determined within the context of the present invention customer satisfaction for a transportation vehicle based upon a correlation which employs multiple measured or calculated variables, such as NVH variables, which in an aggregate are correlated with measured subjective customer satisfaction levels, and wherein there may subsequently interpolated or extrapolated from an aggregate of the correlated measurements an expected subjective customer satisfaction for an additional transportation vehicle for which there does not exist a measured subjective customer satisfaction level, but for which there does exist a NVH variable level.

Within the context of the preferred embodiment of the present invention where there is calculated from interior loudness measurements at a driver's outboard ear: (1) the slope of a Sones versus engine revolutions per minute (rpm) curve (i.e., sm); (2) the peak of a Phons over a Phons versus engine revolutions per minute (rpm) curve (i.e., pmax); and (3) the weighted average of a Phons versus engine revolutions per minute (rpm) curve (i.e., pwavg), there is first determined a Transformed Gamma Distribution (TGD) correlation, as is described in the previously described process step with reference numeral 50 (FIG. 1), for each NVH parameter which are typically and preferably loudness parameters (ie. sm, pmax, pwavg).

With respect to the preferred embodiment of the present invention, wherein there is employed for determining a Transformed Gamma Distribution (TGD) any of the three variables sm, pmax and pwavg, there may then be combined the three Transformed Gamma Distribution (TGD) functions as determined in accord with equation 2 in a fashion which equates measured customer satisfaction levels with an aggregate of the three calculated variables sm, pmax and pwavg, further in accord with equation 12, as follows.

$$CS=F(sm,pmax,pwavg)=a*TGD(sm,\alpha,\beta)+b*TGD(pmax,\alpha,\beta)+c*TGD(pwavg,\alpha,\beta) \qquad (12)$$

Figure 3:
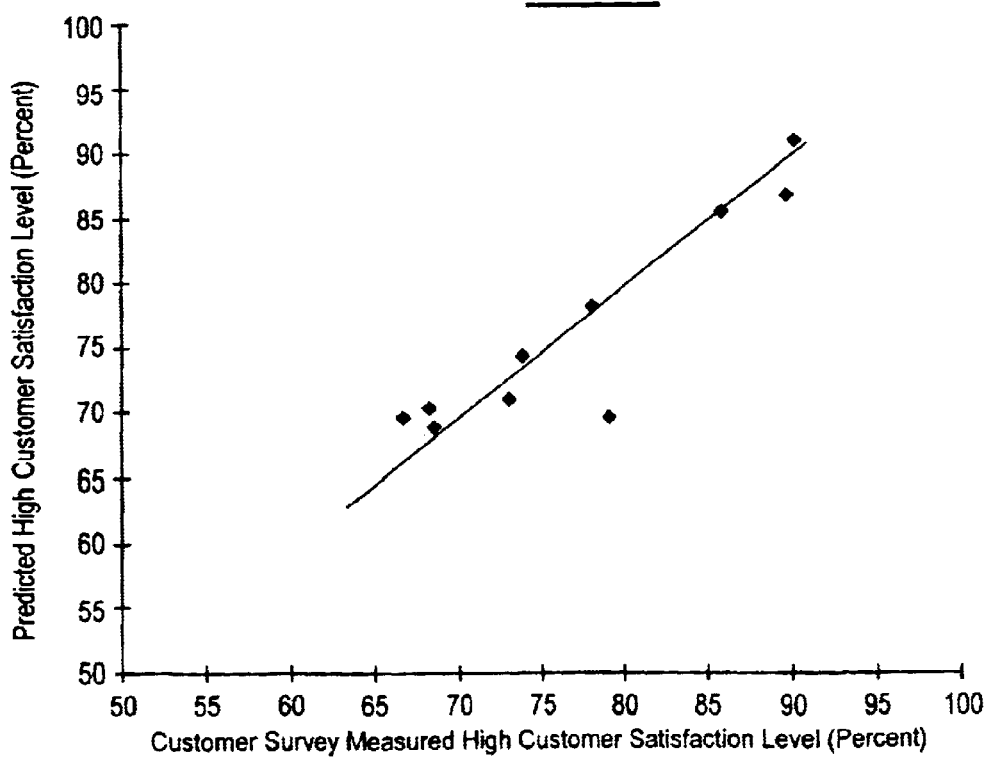

Within equation 12: (1) CS is customer satisfaction, typically in terms of high customer satisfaction (percent); and (2) the coefficients a, b and c are determined experimentally while employing the same unique intelligent range reduction scheme as is employed for determining the coefficients and within equation 2. The initial range for the coefficients a, b and c must be between −1 and 1 and is typically and preferably between 0 and 1 for the loudness variables (ie. sm, pmax, pwavg). As is illustrated within the plot of FIG. 3, which is directed towards an aggregate of predicted versus measured high customer satisfaction levels predicated upon the loudness variables sm, pmax and pwavg, for the same series of eleven wheel drive sport utility transportation vehicles as employed within FIG. 2, there is observed a unity of correlation between predicted and measured high subjective customer satisfaction levels, suggesting that the mathematic assumptions and model upon which the present invention is predicated provides an operative invention.

As is understood by a person skilled in the art, the preferred embodiment and examples of the present invention are illustrative of the present invention rather than limiting of the present invention. Revisions and modifications may be made to transportation vehicle types, measured parameters and calculated variables through which is practiced the method of the present invention, while still providing a method in accord with the present invention, further in accord with the accompanying claims.

What is claimed is:

1. A method for predicting customer satisfaction for a transportation vehicle comprising:

provisioning a group of transportation vehicles;

measuring for the group of transportation vehicles a series of subjective customer satisfaction levels;

measuring for the group of transportation vehicles a series of Noise, Vibration and Harshness (NVH) levels;

correlating, while employing a Least Combination Error (LCE) fit, the series of subjective customer satisfaction levels with the series of Noise, Vibration and Harshness (NVH) levels to provide a correlation; and employing the correlation to provide an expected subjective customer satisfaction level for an additional transportation vehicle for which there does not exist an additional measured subjective customer satisfaction level, but for which there does exist a Noise, Vibration and Harshness (NVH) variable level.

2. The method of claim 1 wherein the transportation vehicle is selected from the group consisting of passenger transportation vehicles, sport utility transportation vehicles, light utility transportation vehicles and heavy utility transportation vehicles.

3. The method or claim 1 wherein the Noise, Vibration and Harshness (NVH) level is selected from the group consisting of a vibration level and noise level.

4. The method of claim 3 wherein the vibration level is selected from the group consisting of a steering wheel vibration level, a seat track vibration level, shift stick vibration level, and a frame/chassis vibration level.

5. The method of claim 3 wherein the noise level is selected from the group consisting of an interior noise loudness, an engine noise loudness, a powertrain noise loudness, an intake system noise loudness and an exhaust system noise loudness.

6. The method of claim 5 wherein the interior noise loudness is measured at a location of a driver's outboard ear within an interior of the transportation vehicle.

7. A method for predicting customer satisfaction for a transportation vehicle comprising:

providing a group of transportation vehicles;

measuring for the group of transportation vehicles a series of subjective customer satisfaction levels;

measuring for the group of transportation vehicles a series of Noise, Vibration and Harshness (NVH) levels within the context of a series of a interior loudness parameters, wherein the series of interior loudness parameters is determined employing each of:

a slope of a linear regression line through a Phons versus an engine revolution per minute (rpm) curve for the group or transportation vehicles;

a maximum Phons over an entire range for a Phons versus the engine revolution per minute (rpm) curve for the group of transportation vehicles; and a Phons weighted average over an entire range for a Phons versus the engine revolution per minute (rpm) curve for the group of transportation vehicles;

correlating the series of subjective customer satisfaction levels with the series of Noise, Vibration and Harshness (NVH) levels to provide a correlation; and employing the correlation to provide and expected subjective customer satisfaction level for an additional transportation vehicle for which there does not exist an additional measured subjective customer satisfaction level, but for which there exist a Noise, Vibration and Harshness (NVH) variable level.

8. The method of claim 7 wherein the group of transportation vehicles is selected from the group consisting of passenger transportation vehicles, sport utility transportation vehicles, light utility transportation of vehicles and heavy utility transportation vehicles.

9. The method of claim 7 wherein the series of Noise, Vibration and Harshness (NVH) levels is selected from the group consisting of a series of vibration levels and a series of noise levels.

10. The method of claim 9 wherein the series of vibration levels is selected from the group consisting of steering wheel vibration levels, seat track vibration levels, shift stick vibration levels, and frame/chassis vibration levels.

11. The method of claim 9 wherein the series of noise level is selected from the group consisting of interior noise loudness levels, engine noise loudness levels, powertrain noise loudness levels, intake system noise loudness levels and exhaust system noise loudness levels.

12. The method of claim 11 wherein the series of interior noise loudness levels is measured at a location of a driver's outboard ear within a series of interiors of the group of transportation vehicles.

* * * * *